(12) United States Patent
Inversin et al.

(10) Patent No.: US 11,030,820 B1
(45) Date of Patent: Jun. 8, 2021

(54) SYSTEMS AND METHODS FOR SURFACE DETECTION

(71) Applicant: Facebook Technologies, LLC, Menlo Park, CA (US)

(72) Inventors: Panya Inversin, Zurich (CH); Alexander Sorkine Hornung, Zurich (CH)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/922,924

(22) Filed: Jul. 7, 2020

Related U.S. Application Data

(60) Provisional application No. 62/944,358, filed on Dec. 5, 2019.

(51) Int. Cl.
| | | |
|---|---|---|
| *G06T 19/00* | (2011.01) | |
| *G06F 3/01* | (2006.01) | |
| *G06F 3/0346* | (2013.01) | |
| *G06T 19/20* | (2011.01) | |
| *G06F 3/0481* | (2013.01) | |
| *G06T 11/40* | (2006.01) | |
| *G06T 15/00* | (2011.01) | |

(52) U.S. Cl.
CPC ............ *G06T 19/006* (2013.01); *G06F 3/011* (2013.01); *G06F 3/0346* (2013.01); *G06F 3/04815* (2013.01); *G06T 11/40* (2013.01); *G06T 19/20* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 2015/0269783 A1* | 9/2015 | Yun | G06F 3/0304 345/633 |
| 2016/0371886 A1* | 12/2016 | Thompson | G06F 3/013 |
| 2018/0158250 A1* | 6/2018 | Yamamoto | G06F 3/017 |
| 2019/0019348 A1 | 1/2019 | Yamamoto | |

OTHER PUBLICATIONS

International Search Report and Written Opinion for International Application No. PCT/US2020/060492. dated Feb. 24, 2021.
Hurt, et al., A Comparison of Several Plane Fit Algorithms, Annals of the CIRP, vol. 29, No. 1, pp. 381-384. 1980.

* cited by examiner

*Primary Examiner* — Nicholas R Wilson
(74) *Attorney, Agent, or Firm* — Baker Botts L.L.P.

(57) ABSTRACT

In one embodiment, a method includes: tracking first positions of a controller in a three-dimensional space; determining a plurality of planes based on the first positions; determining that the plurality of planes are within a threshold deviation of each other; generating a virtual plane based on the plurality of planes; tracking second positions of the controller in the three-dimensional space; identifying one or more of the second positions that are within a threshold distance of the virtual plane; generating a drawing in the virtual plane based on the one or more of the second positions; and rendering a scene depicting the drawing.

20 Claims, 12 Drawing Sheets

SYSTEMS AND METHODS FOR SURFACE DETECTION

PRIORITY

This application claims the benefit, under 35 U.S.C. § 119(e), of U.S. Provisional Patent Application No. 62/944,358 filed 5 Dec. 2019, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to methods and systems for detecting a virtual plane that corresponds to a surface on which a user intends to draw based on controller or hand tracking data. The virtual plane may be used to enable a virtual whiteboard feature, for example. The method may be performed by a computing system. While a user moves a controller for drawing or writing in mid-air or a three-dimensional space, the computing system is configured to track first positions of the controller in a three-dimensional space. The method may be configured to sample the tracked positions during a tracking time of T period, and determine a plurality of planes based on the first positions tracked during the T period. The method may be configured to determine that the plurality of planes are within a threshold deviation of each other, and generate a virtual plane based on the plurality of planes. The method may be configured to track second positions of the controller from the sampled times of the controller's drawing or writing in the three-dimensional space, and identify one or more of the second positions that are within a threshold distance of the virtual plane. The method may be configured to generate a drawing in the virtual plane based on the one or more of the second positions and render a scene depicting the drawing.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
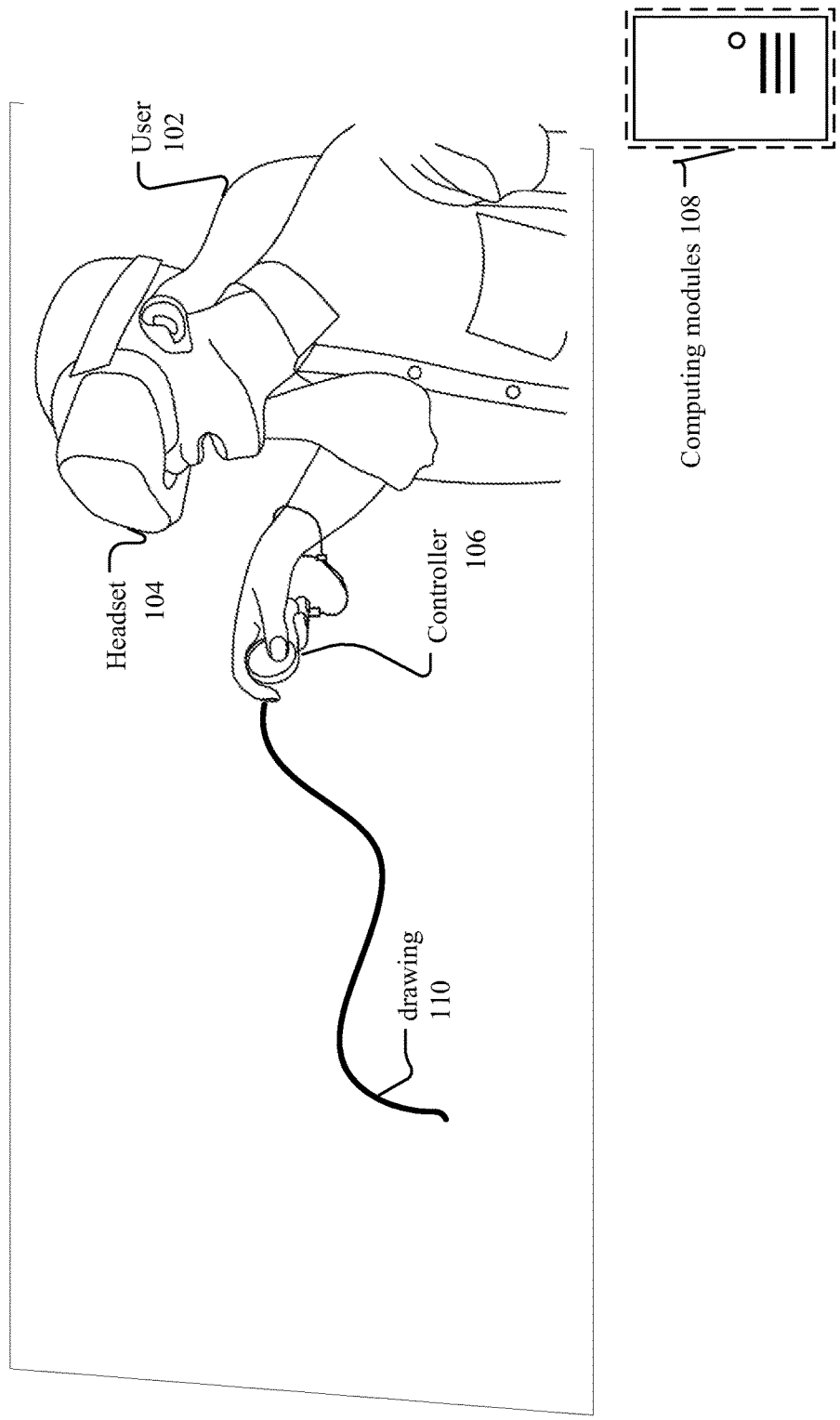
FIG. 1 illustrates an example of a controller's drawing in a three-dimensional space.

AR/VR users may wish to write or draw in a virtual environment, such as on a virtual whiteboard or paper, to be shared with co-located or remote users. In order to write or draw in AR/VR environment, the user may need to physically perform the motion of writing or drawing in the physical world. However, it is difficult to write or draw in empty space without haptic feedback from a physical surface. Thus, particular embodiments of the present disclosure provide a virtual writing or drawing feature that links a virtual surface for writing or drawing with a physical surface, thereby allowing the user's physical writing or drawing motion to be translated to the virtual surface.

There are several ways for the AR/VR system to detect when the user is writing or drawing on a physical surface.

For example, one way is to use computer vision techniques. However, computer vision typically requires visible features of the surface to be detectable, which means that surface detection would be difficult when the user is using a glass surface, a large table, or a featureless wall. Another possibility is for the user to manually define the physical surface by, for example, placing QR codes on the physical surface, setting up a networked whiteboard, or undergoing some other manual setup procedure. Such manual procedures, however, are cumbersome and not ideal.

Particular embodiments of the present disclosure provide a virtual writing or drawing feature that is triggered upon detection that the user is writing or drawing in a substantially flat plane, such as when the user is moving his hand or controller along a physical surface (e.g., a physical window, table, wall, etc.). In particular, detection of the AR/VR surface may be based on the motion of the user's controller or hand. The AR/VR system may include a headset, a hand-held or wearable controller (or stylus pen), and one or more computing modules. While a user moves the controller to draw a curve, the computing module may execute an algorithm to track the controller's positions over a predetermined time frame (T) to detect whether the user is writing or drawing on a physical surface. If the user is moving the controller in empty space (e.g., three-dimensional space), then the presumption is that the positions of the controller would unlikely to remain in the same plane, as it is difficult to do so without the support of a physical surface. On the other hand, if the controller's positions do remain in the same plane, then it is likely that the user is moving the controller along a flat physical surface. In that case, the AR/VR writing/drawing feature would be enabled.

In one embodiment, an objective of the surface-detection algorithm is to estimate the virtual plane that coincides with the physical surface used by the user. The virtual plane is needed so that the system would know when the user intends to draw. For example, by comparing the relative position of the user's controller and the virtual plane, the system would know when the user's controller is touching the plane (or the corresponding physical surface), which is an indication that the user intends to draw on the surface. In a similar manner, when the user's controller is not sufficiently close to the plane, the system would know that the user does not intend to draw at that moment.

In one embodiment, the algorithm for estimating the virtual plane may include the following: (1) tracking the controller's positions during the T time period; (2) splitting the tracked positions in the T period into three or more buckets (e.g., B1, B2, B3 in FIG. 2); (3) determining a plurality of planes (e.g., $A_i$ to $A_j$) each of which is formed with three or more controller positions (e.g., at $t_{11}$ in B1, at $t_{21}$ in B2, and at $t_{31}$ in B3) randomly selected from the three or more buckets (or segments); (4) determining normal vectors (e.g., $N_i$ to $N_j$) of the planes and, if they are within a threshold deviation of each other, determining a co-plane (e.g., $A_c$) that corresponds to the physical surface based on the normal vectors of the planes (used for defining the orientation of the co-plane) and an anchor point (used for defining the position of the co-plane); and (5) displaying a drawn figure on a virtual drawing surface according to intersections between the user's controller and the co-plane. The algorithm may continuously adjust the orientation of the co-plane as the user draws more.

In one embodiment, the method performed by a computing system includes tracking first positions of a controller in a three-dimensional space and determining a plurality of planes based on the first positions. The method further includes determining that the plurality of planes are within a threshold deviation of each other and generating a virtual plane based on the plurality of planes. The user may draw on the virtual plane using the controller. For example, the computing system may track second positions of the controller in the three-dimensional space. The method furthermore includes identifying one or more of the second positions that are within a threshold distance of the virtual plane and generating a drawing in the virtual plane based on the one or more of the second positions such that a scene depicting the drawing is rendered.

FIG. 1 illustrates an example of a computing system for a controller's drawing in a three-dimensional space. The AR/VR system 100 may include a headset 104, a hand-held or wearable controller (or stylus pen) 106, and one or more computing modules 108. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102. When a user 102 moves a controller 106 in a three-dimensional space, the system 100 may track a plurality of positions of a drawing 110 drawn by the controller's continuous movements to generate a virtual plane based on the tracked positions. The virtual plane is used for rendering a scene depicting a figure corresponding to the drawing 110. The system 100 may sample the positions in unit of times as shown in FIG. 2.

Figure 2:
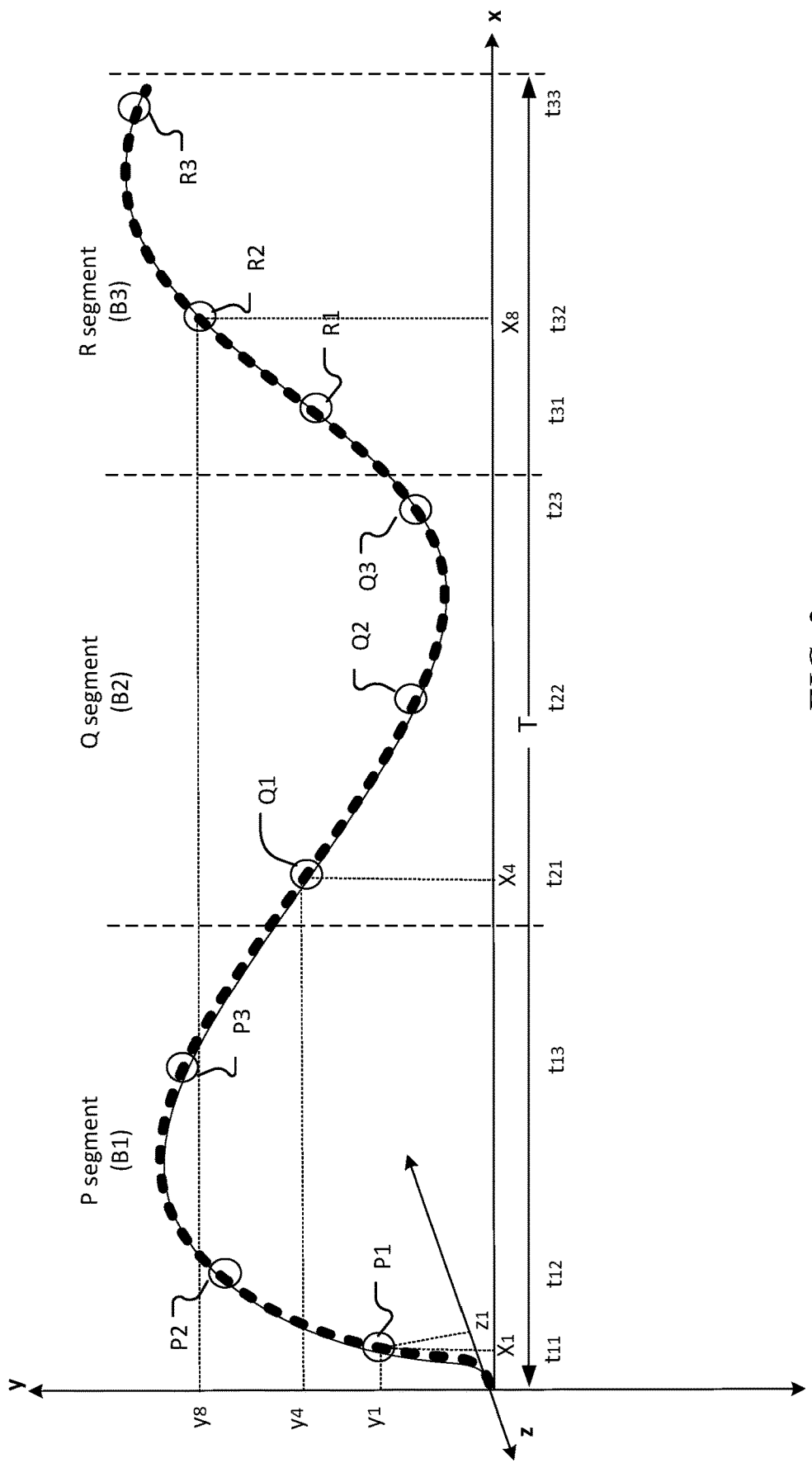
FIG. 2 illustrates an example of positions of the drawing sampled during a predetermined time of T period.

FIG. 2 illustrates an example of positions of the drawing 110 sampled during a predetermined time of T period. FIG. 2 represents the sampled positions detected in three dimensions (3D) during the sampled T time period, but for clarity and simplicity, the figure is drawn in two dimensions (2D). The system 100 (or computing modules 108) may split a predetermined period of time (T) into three or more times segments (e.g., P segment (B1), Q segment (B2), and R segment (B3) in FIG. 2). FIG. 2 shows several positions (e.g., P1, P2, and P3 positions in the P segment; Q1, Q2, and Q3 positions in the Q segment; R1, R2, and R3 positions in the R segment), which are tracked during the sampled T time period for the drawing 110. For example, since these tracked positions may be in 3D, each position may have a corresponding 3D coordinate detected at a specific time (e.g., P1 may have a coordinate of $(x_1, y_1, z_1)$ detected at time $t_{11}$, Q1 may have a coordinate of $(x_4, y_4, z_4)$ detected at time $t_{21}$, and R2 may have a coordinate of $(x_8, y_8, z_8)$ detected at time $t_{32}$, etc.). The system 100 may continue to track positions of the controller's movements drawn in the three-dimensional space. In order to find an active plane in which the controller 106 is drawing or writing, the system 100 may sample one or more groups of the positions (e.g., first positions, second positions, third positions, etc.) from the time segments, where each group of positions is used to determine a plurality of planes.

Figure 3:
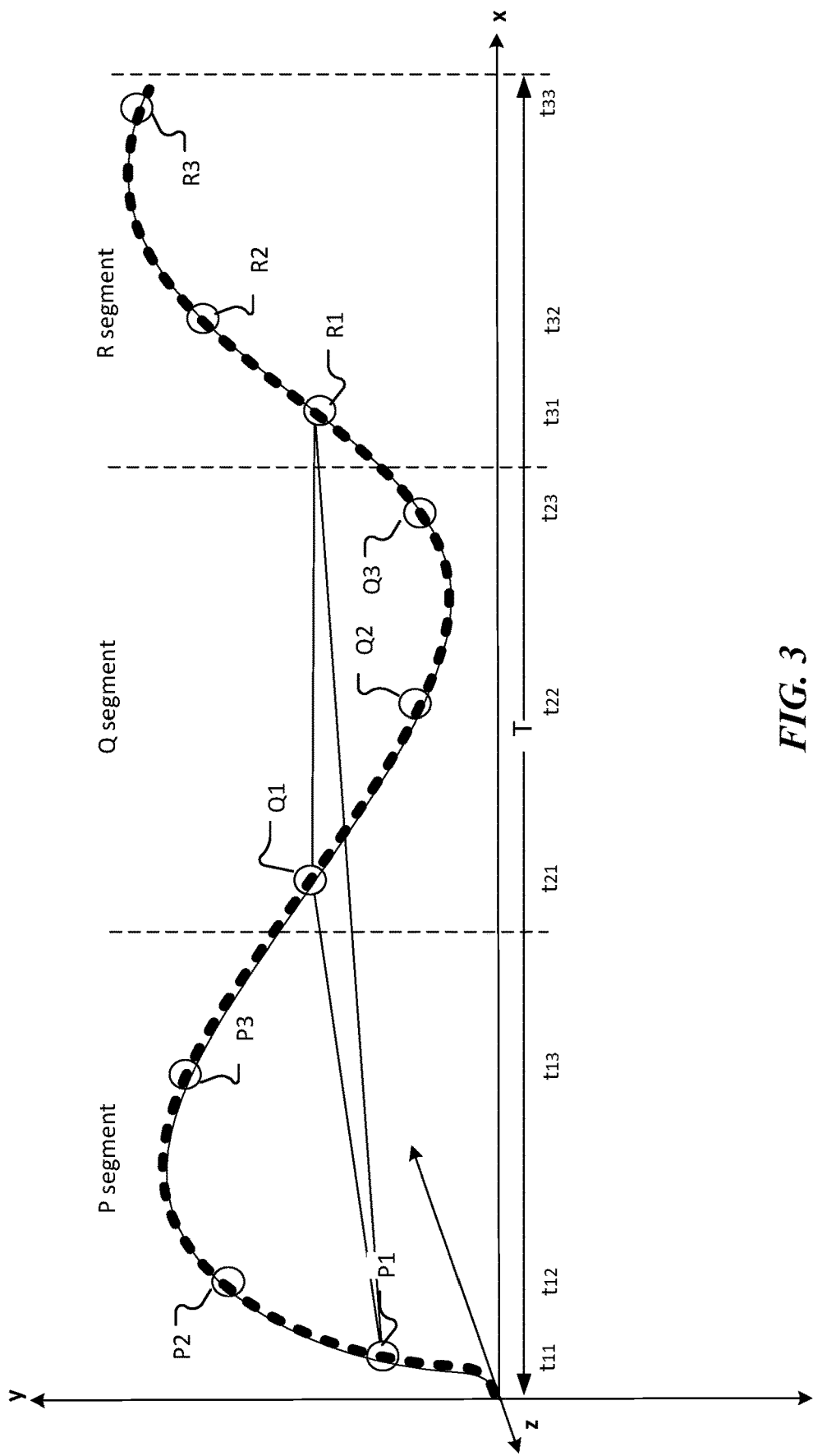
FIGS. 3 to 5 illustrate examples of determining a plurality of planes based on the tracked positions.
Figure 4:
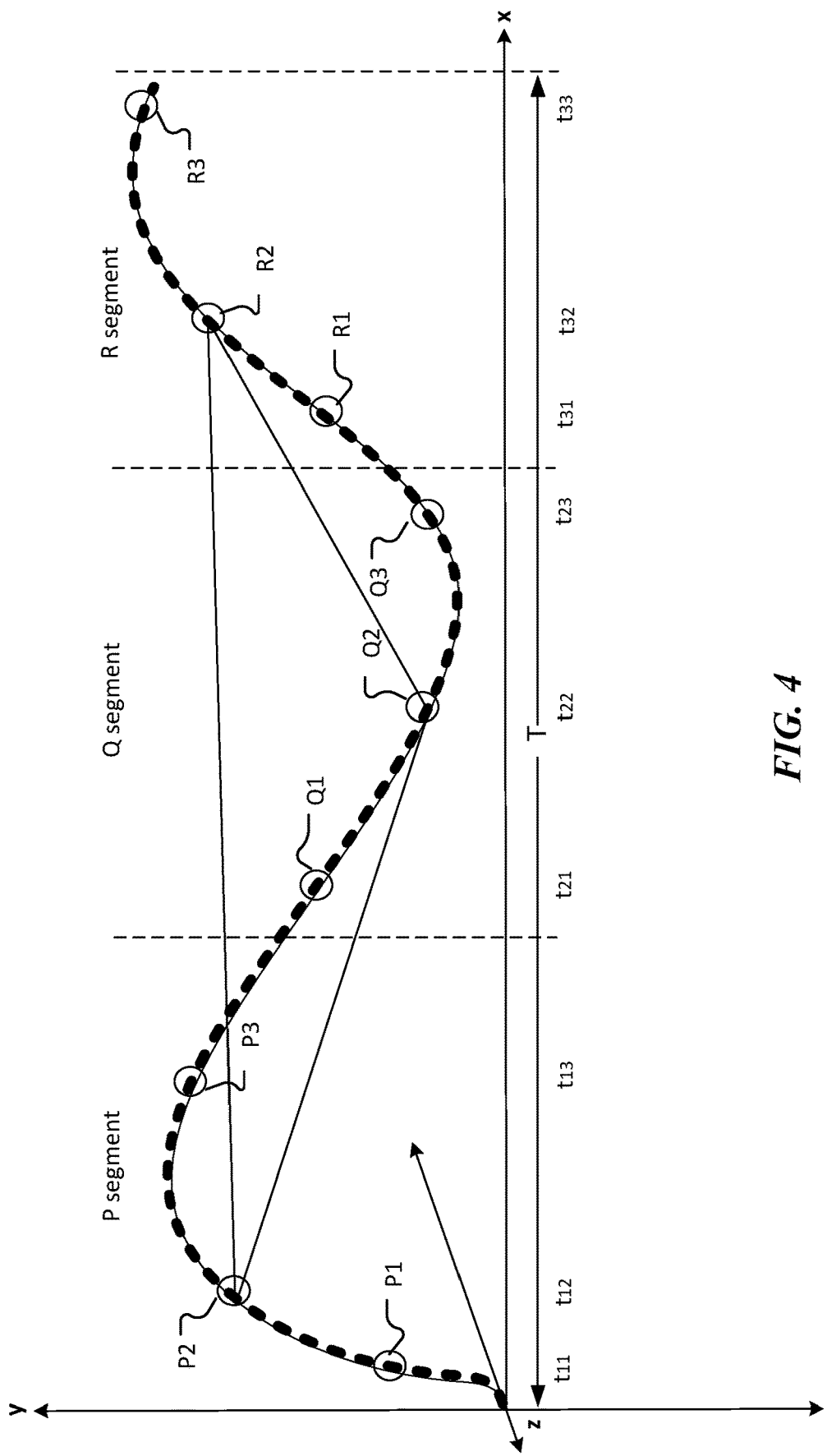
Figure 5:
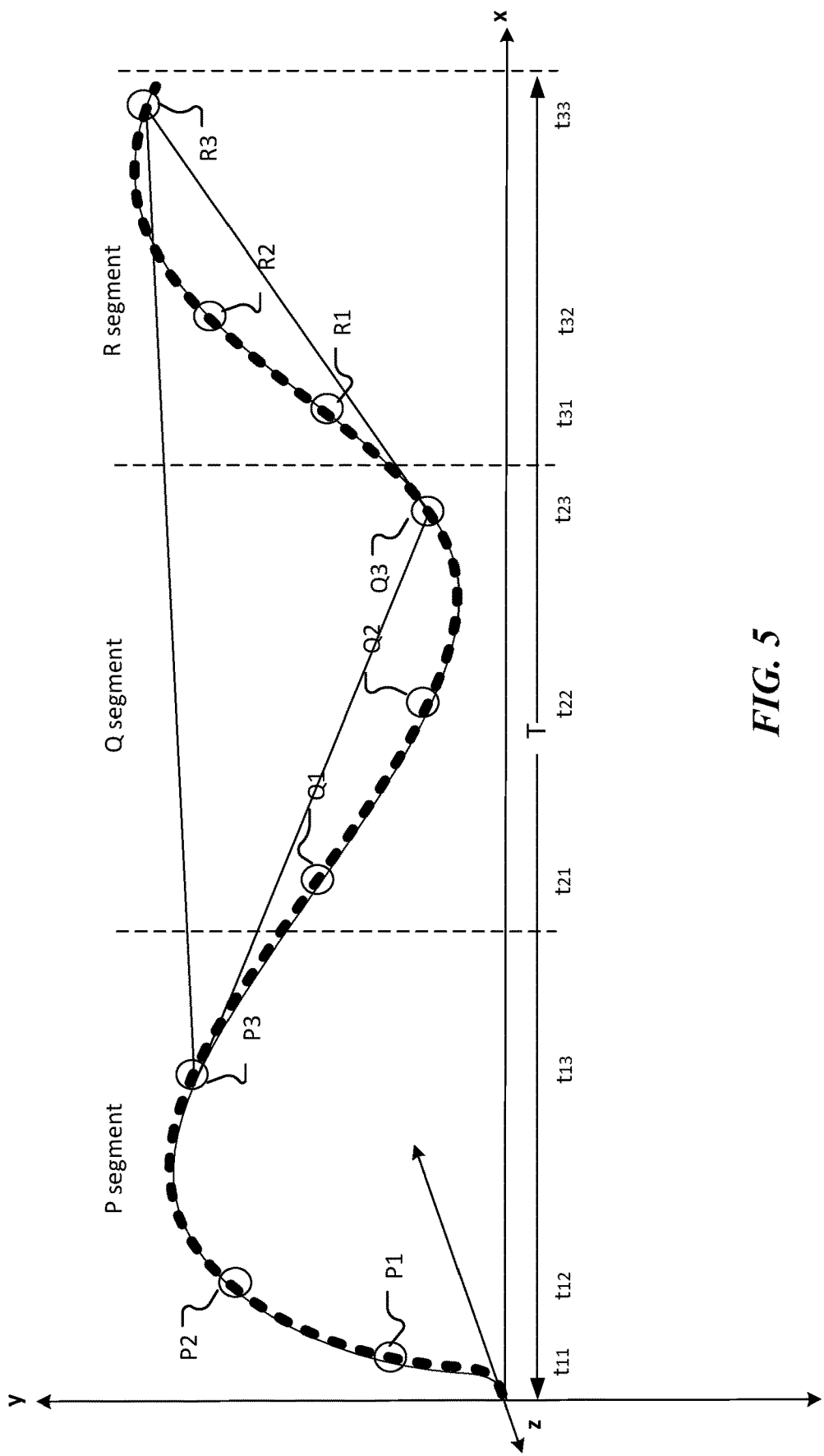

FIGS. 3 to 5 illustrate examples of determining a plurality of planes based on the tracked positions (although illustrated in 2D, these tracked positions may be in 3D). In FIGS. 3 to 5, the system 100 determines $A_1$ plane based on P1, Q1 and R1 positions, $A_2$ plane based on P2, Q2 and R2 positions, and $A_3$ plane based on P3, Q3 and R3 positions. This is only one example for defining planes; it should be understood by one of ordinary skill in the art that a plane may be defined in any suitable way using the positions. For example, a plane may be defined by (1) P1, Q3, and R1; (2) P2, Q1, and R3; (3) P1, P3, Q2, and R3; or any other suitable combination of the sampled positions.

The system 100 may estimate the plurality of planes to determine whether the plurality of planes are within a predetermined threshold deviation of each other using, for example, their respective normal vectors. For example, the system 100 may determine whether the relative angular difference between the planes are within a threshold number of degrees (e.g., 0 degree, 3 degrees, 5 degrees, etc.). Based on the estimation process, the system 100 may generate a virtual plane based on the plurality of planes. For example, the virtual plane may be an approximate or average of the plurality of planes. In particular embodiments, the manner for determining whether the plurality of planes are within a threshold deviation of each other and the manner for generating the virtual plane may be based on a plurality of normal vectors of the plurality of planes.

Figure 6:
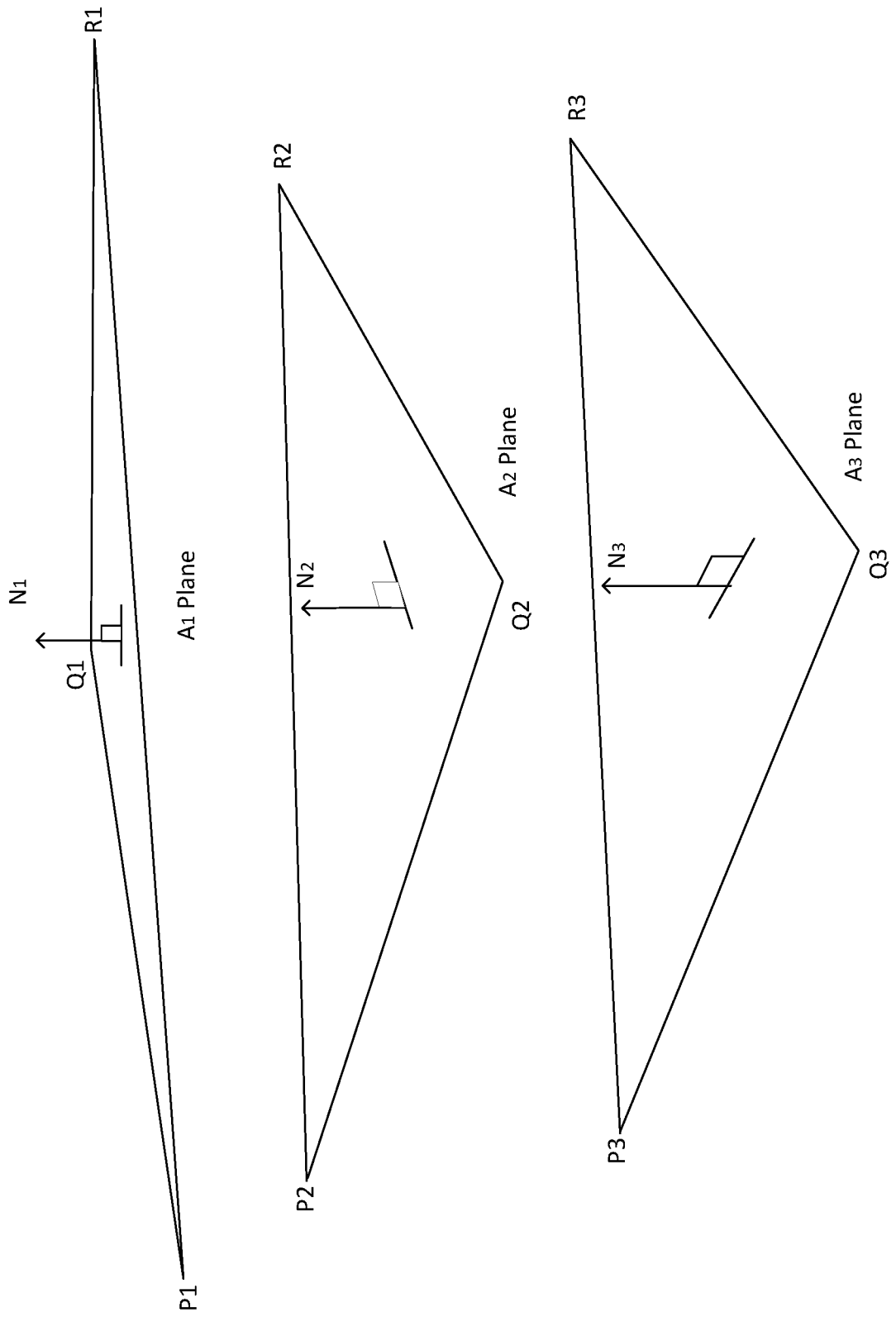
FIG. 6 illustrates an example of determining a plurality of normal vectors based on the plurality of planes.

FIG. 6 illustrates an example of determining a plurality of normal vectors based on the plurality of planes. Referring to FIG. 6, the system 100 may determine the normal vectors (e.g., $N_1$, $N_2$, and $N_3$) corresponding to the plurality of planes (e.g., $A_1$, $A_2$, and $A_3$ planes). Each normal vector may be computed by taking the cross product of two vectors in the corresponding plane (e.g., $N_1$ may be computed by a cross product of the P1-R1 vector and the P1-Q1 vector in the $A_1$ plane; $N_2$ may be computed by a cross product of the P2-Q2 vector and the P2-R2 vector in the $A_2$ plane; and $N_3$ may be computed by a cross product of the P3-Q3 vector and the P3-R3 vector in the $A_3$ plane). The normal vectors may then be used to generate a virtual plane, as will be described in further detail with reference to FIGS. 7-9.

In particular embodiments, the computing system may make a threshold determination of whether the plurality of planes (e.g., $A_1$, $A_2$, and $A_3$ planes) sampled from the user's drawing are sufficiently co-planar. Whether the planes are sufficiently co-planar could be an indication of the user's intent to draw in a virtual plane. For example, if the user is moving his controller in space without intending to draw on a flat surface, the plurality of planes generated from the motion of the controller would likely deviate significantly from one another. In contrast, if a user is moving the controller over a physical surface or is trying to maintain his drawing within an imaginary plane, then the plurality of planes generated from the motion of the controller would likely have similar orientations (e.g., the orientations of the planes would be within a threshold deviation, such as 1, 3, or 6 degrees).

Figure 7:
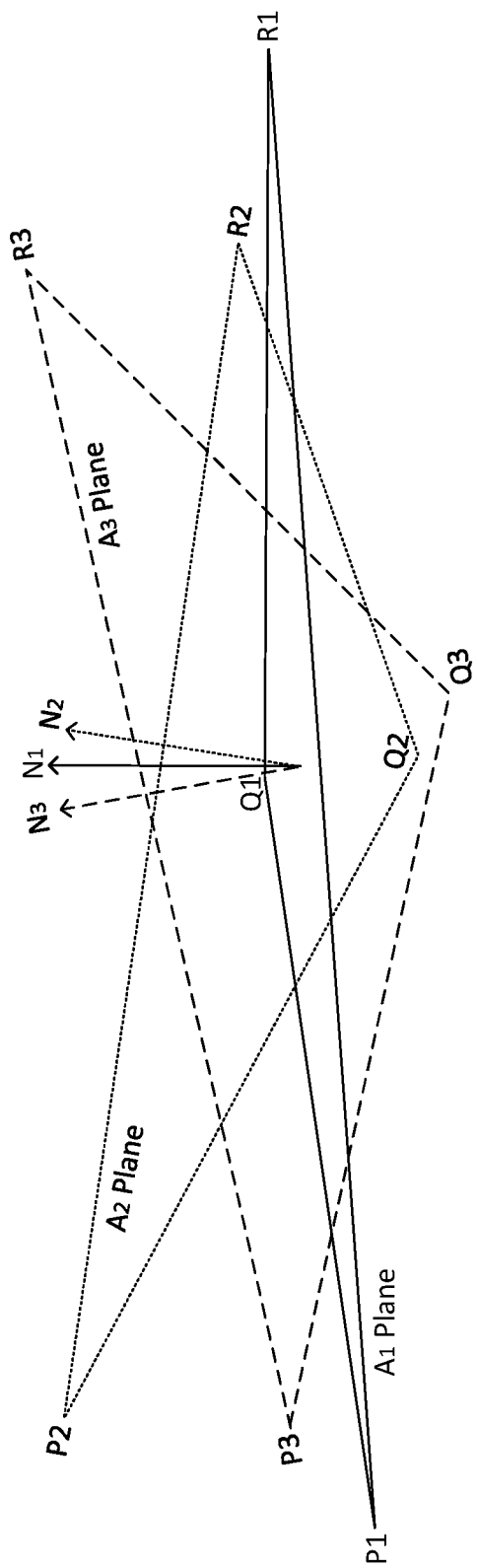
FIG. 7 illustrates an example of using the normal vectors of a plurality of planes to determine whether the planes are sufficiently co-planar.

In particular embodiments, the orientations of the planes may be represented and compared using their respective normal vectors. FIG. 7 illustrates an example of using the normal vectors of a plurality of planes to determine whether the planes are sufficiently co-planar. FIG. 7 shows the aforementioned planes $A_1$, $A_2$, and $A_3$ having respective normal vectors N1, N2, and N3. Each plane's orientation would be reflected in its normal vector. Thus, if the normal vectors align (i.e., the vectors are parallel to one another), then their corresponding planes would be co-planar. On the other hand, deviations between the normal vectors would provide an indication that their corresponding planes have different orientations. Depending on the magnitude of the deviation, the computing system may determine whether the user intends to draw within the same virtual plane. For example, if the magnitude of the deviation is above a certain threshold (e.g., 3 degrees), then the computing system may conclude that the user is not drawing on a physical surface. On the other hand, if the magnitude of the deviation is within the threshold, then the computing system may conclude that the user is drawing on a physical surface or is at least attempting to draw on an imagery plane.

Figure 8:
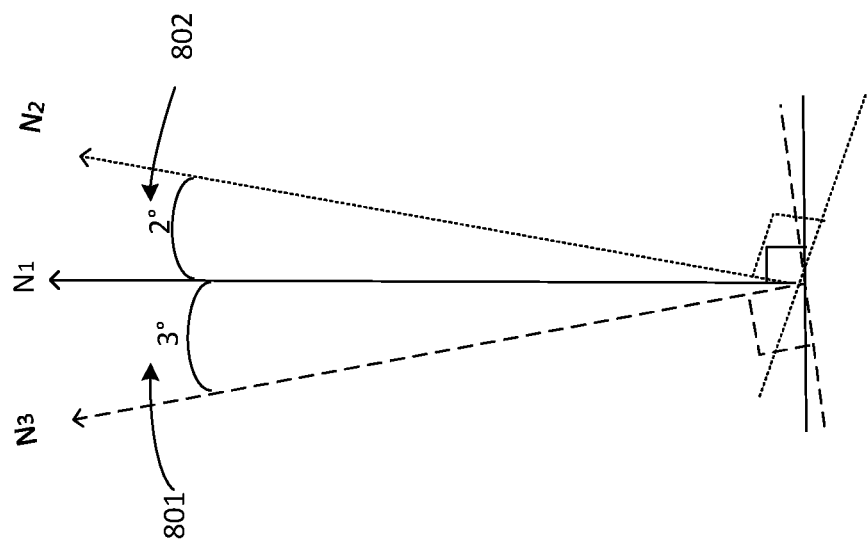
FIG. 8 is an example comparison between the normal vectors illustrated in FIG. 7.

FIG. 8 is an example comparison between the normal vectors illustrated in FIG. 7. In particular embodiments, the computing system may determine if the orientation of the plurality of planes are within a threshold deviation (e.g., $D_{th}$) of each other. This may be done by comparing the normal vectors (e.g., $N_1$, $N_2$ and $N_3$) of the planes. For example, assuming the threshold deviation (e.g., $D_{th}$) is set as 5 degrees, the system 100 may determine whether the relative angular difference between the normal vectors of the planes (e.g., $A_1$, $A_2$ and $A_3$ planes) is within 5 degrees. In FIG. 8, a first relative angular difference 801 between the $A_3$ and $A_1$ planes is determined to be 3 degrees by comparing the normal vector $N_1$ of the $A_1$ plane and the normal vector $N_3$ of the $A_3$ plane. Similarly, a second relative angular difference 802 between the $A_1$ and $A_2$ planes is determined to be 2 degrees by comparing their normal vectors $N_1$ and $N_2$. Since the relative angular difference between the $A_1$, $A_2$ and $A_3$ planes is within the threshold range of 5 degrees, the system 100 may determine that the $A_1$, $A_2$, and $A_3$ planes are sufficiently co-planar. The system 100 then determines that normal vectors $N_1$, $N_2$ and $N_3$ for $A_1$, $A_2$, and $A_3$ planes are valid and may be used to compute a normal vector (e.g., $N_c$) for a virtual plane (e.g., $A_c$) on which the user may draw. If instead the threshold $D_{th}$ is set to be 1 degree, then the system 100 may determine that the plurality of planes (e.g., $A_1$, $A_2$ and $A_3$ planes) are not sufficiently co-planar to trigger the drawing features.

Figure 9:
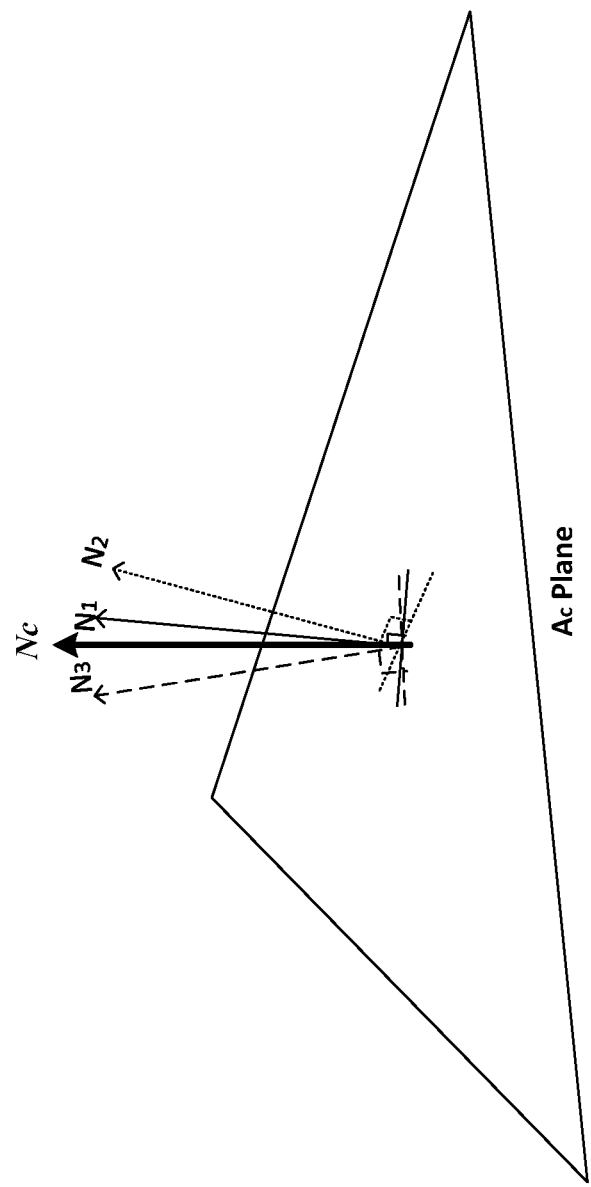
FIG. 9 illustrates an example of determining a virtual plane based on the plurality of planes.

FIG. 9 illustrates an example of approximating a normal vector for a virtual plane. If comparing the normal vectors (e.g., $N_1$, $N_2$, and $N_3$) of the planes (e.g., $A_1$, $A_2$ and $A_3$ planes) indicates that the planes are substantially co-planar (or within a threshold degree of deviation), then the system 100, in particular embodiments, may use the normal vectors of the planes to approximate a normal vector (e.g., $N_c$) for the virtual plane (e.g., $A_c$). For example, the normal vector (e.g., $N_c$) of the virtual plane may be an average representation of the normal vectors (e.g., $N_1$, $N_2$, $N_3$) of the plurality of sampled planes. The normal vector (e.g., $N_c$) may then be used to define the orientation of the virtual plane (e.g., $A_c$). Thus, the virtual plane $A_c$ may be estimated based on the normal vector $N_c$ and/or by computing an average representation of the $A_1$, $A_2$ and $A_3$ planes.

The normal vector $N_c$ defines the orientation of the virtual plane $A_c$, but it does not specify the plane's position in space. For example, if the normal vector $N_c$ points straight up, the corresponding virtual plane $A_c$ would be a horizontal surface. However, that horizontal surface could be at any height. Thus, to determine the position of the virtual plane $A_c$, the system may further determine an anchor point in coordinate space to anchor the normal vector $N_c$ in that space. The anchor point is used with the normal vector $N_c$ to define the particular virtual plane $A_c$ used for defining the surface on which the user is drawing or writing. In particular embodiments, the anchor point may be any of the tracked points defining the curve drawn by the user (e.g., referring to FIG. 2, any of the points P1, P2, P3, Q1, Q2, Q3, R1, R2, R3) or any point along that curve. In particular embodiments, the anchor point may alternatively be defined using an aggregate of the tracked points (e.g., an average of multiple ones of the tracked points).

In particular embodiments, the virtual plane (e.g., $A_c$), which may correspond to a drawing surface (e.g., a virtual whiteboard), may then be used to determine whether the user intends to draw on the drawing surface. The system 100 may track the controller 106 in three-dimensional space and identify one or more of the second positions that are within a threshold distance of the virtual plane. The positions that are identified to be close to the virtual plane indicates that the user intends to draw on the drawing surface represented by the virtual plane. The positions that are identified not to be close to the virtual plane indicates that the user does not intend to draw on the drawing surface. The system 100 may generate the drawing 110 in the virtual plane based on the one or more of the second positions that are sufficiently close to the virtual plane. The system 100 may transform the drawing 110 in the virtual plane into a virtual scene depicting the drawing 110. The scene may be rendered from the viewpoint of the user 102 and displayed on the headset 104.

In particular embodiments, the virtual plane may be continuously adjusted while the controller's positions are continuously tracked in a drawing session. As previously described, when the user moves his controller or hand, the system 100 may track its positions in space. The tracked positions may be sampled to form a plurality of planes, and those planes may be used to determine whether the user is drawing within the same plane (corresponding to a virtual plane for the plurality of planes). If so, then a virtual plane may be generated, and the drawing session may begin. During the drawing session, the system 100 may continue to track the positions of the user's controller or hand and compare them to the virtual plane to determine whether the user intends to draw on the surface represented by the virtual plane. The tracked positions that are close to the virtual plane (e.g., as determined based on a threshold distance, such as 5 mm, 1 cm, etc.) may be recorded and used to render the user's drawing, as described above. In addition, the system 100 may use the tracked positions that are close to the virtual plane and form additional planes, similar to the discussion above with reference to FIGS. 2-9. The additional planes may be compared (e.g., using their normal vectors) to the virtual plane. If the additional planes deviate from the virtual plane within a predetermine threshold, then the orientation of the virtual plane may be adjusted based on the orientations of those additional planes. In this manner, the virtual plane may more accurately represent the surface on which the user is drawing.

Figure 10:
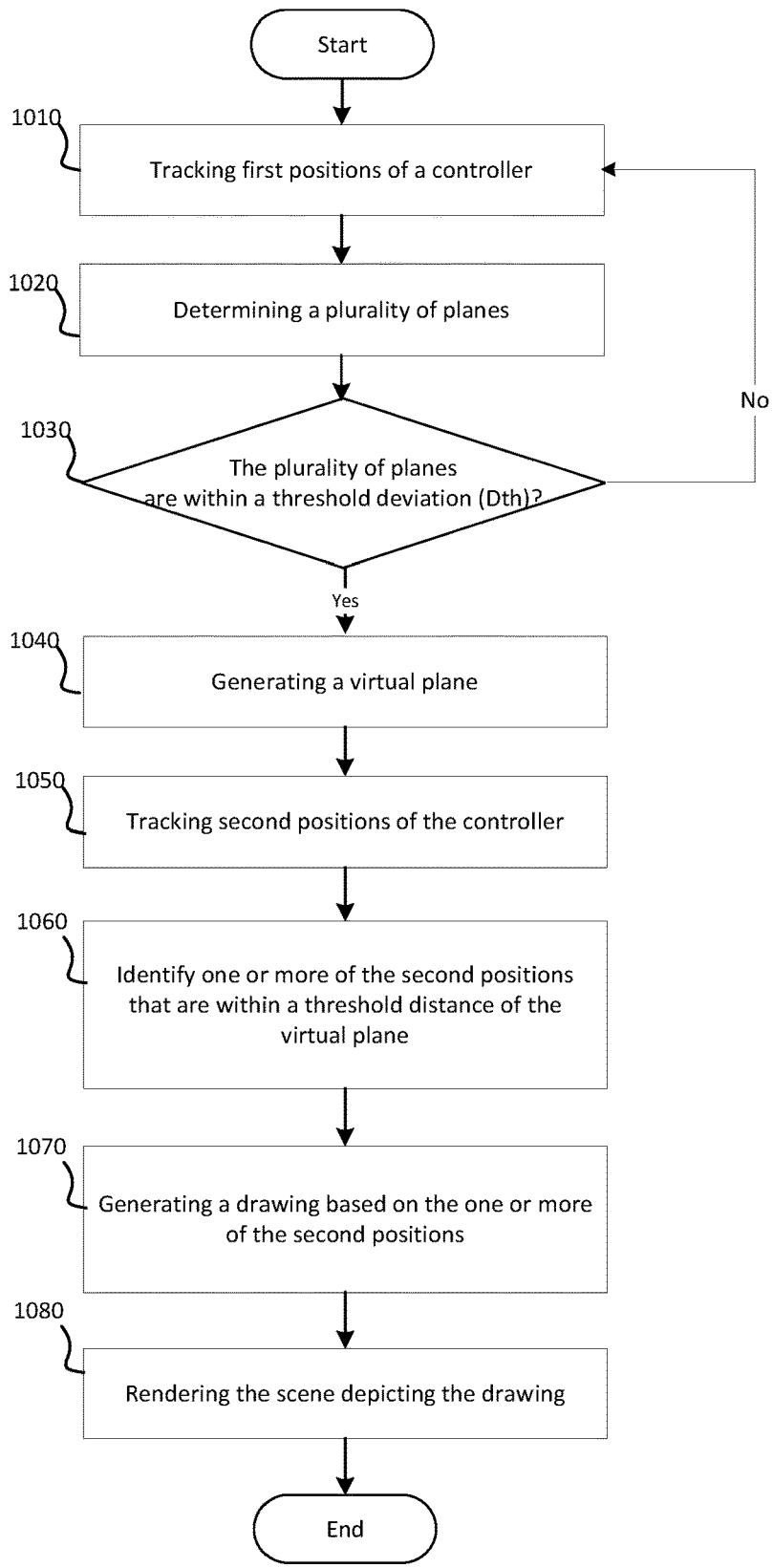
FIG. 10 illustrates an example flow chart of detecting a drawing surface corresponding to a virtual plane.

FIG. 10 illustrates an example flow chart of detecting a drawing surface corresponding to a virtual plane. At Step 1010, the system 100 tracks first positions of the controller 106 or the user's hand/fingers in a three-dimensional space. For example, referring to FIGS. 1 and 10, when the user 102 moves the controller 106 in three-dimensional space, the AR/VR system 100 may track a plurality of positions of a drawing 110 corresponding to the controller's movements. At Step 1020, the system 100 may determine a plurality of planes based on the first positions. For example, the system 100 may sample the positions in a unit of time (e.g., a predetermined period of time T in FIG. 2) and split the sampled T time period into three or more times segments (e.g., P, Q and R segments in FIG. 2). The system 100 may select positions from each of the segments and use the selected positions to define planes. For example, the system 100 may randomly select three positions from three time segments, respectively, and use the three selected positions to determine a corresponding plane. In a similar manner, the system 100 may determine a plurality of planes. At Step 1030, the system 100 may determine whether the plurality of planes are within a predetermined threshold deviation (e.g., $D_{th}$=5 degrees) of each other. If the orientation of the plurality of planes (e.g., represented by normal vectors) exceed the threshold deviation, then the system 100 may return to Step 1010 and continue to track the positions of the controller or the user's hands/fingers. On the other hand, if the plurality of planes are within the threshold deviation, then then system 100 may trigger the drawing feature and generate a virtual plane. At Step 1040, the system 100 generate a virtual plane based on all or parts of the planes which have been determined to be within the threshold deviation. For example, the normal vectors of those planes may be used to compute an average normal vector. In addition, the system may compute an anchor point for anchoring the average normal vector based on the tracked positions. The average normal vector and the anchor point may be used to define a virtual plane on which the user may subsequently draw.

At Step 1050, the system 100 may continue to track second positions of the controller or the user's hands/fingers. As the user draws in space, the tracked drawing positions may sometimes be within the threshold distance of the virtual plane and somethings outside of that threshold distance. At Step 1060, the system 100 may identify one or more of the second positions that are within the threshold distance of the virtual plane. The one or more of the second positions identified to be within the threshold distance may indicate that the user 102 intends to draw on a drawing surface corresponding to the virtual plane. For the other second positions that are not within the threshold distance, the system 100 may determine that the user 102 does not intend to draw on the virtual plane and, consequently, disregard those tracked positions. At Step 1070, the system 100 may generate a drawing in the virtual plane based on the one or more of the second positions that are determined to be within the threshold distance of the virtual plane. For example, the system 100 may generate and persist a virtual line that corresponds to a continuous sequence of track positions that are within the threshold distance of the virtual plane. At Step 1080, the system 100 may render a scene depicting the drawing. For example, the scene may be rendered based on the user's viewpoint relative to the virtual line drawn by the user. The rendered image may then be displayed to the user via, e.g., the user's headset 104.

Figure 11:
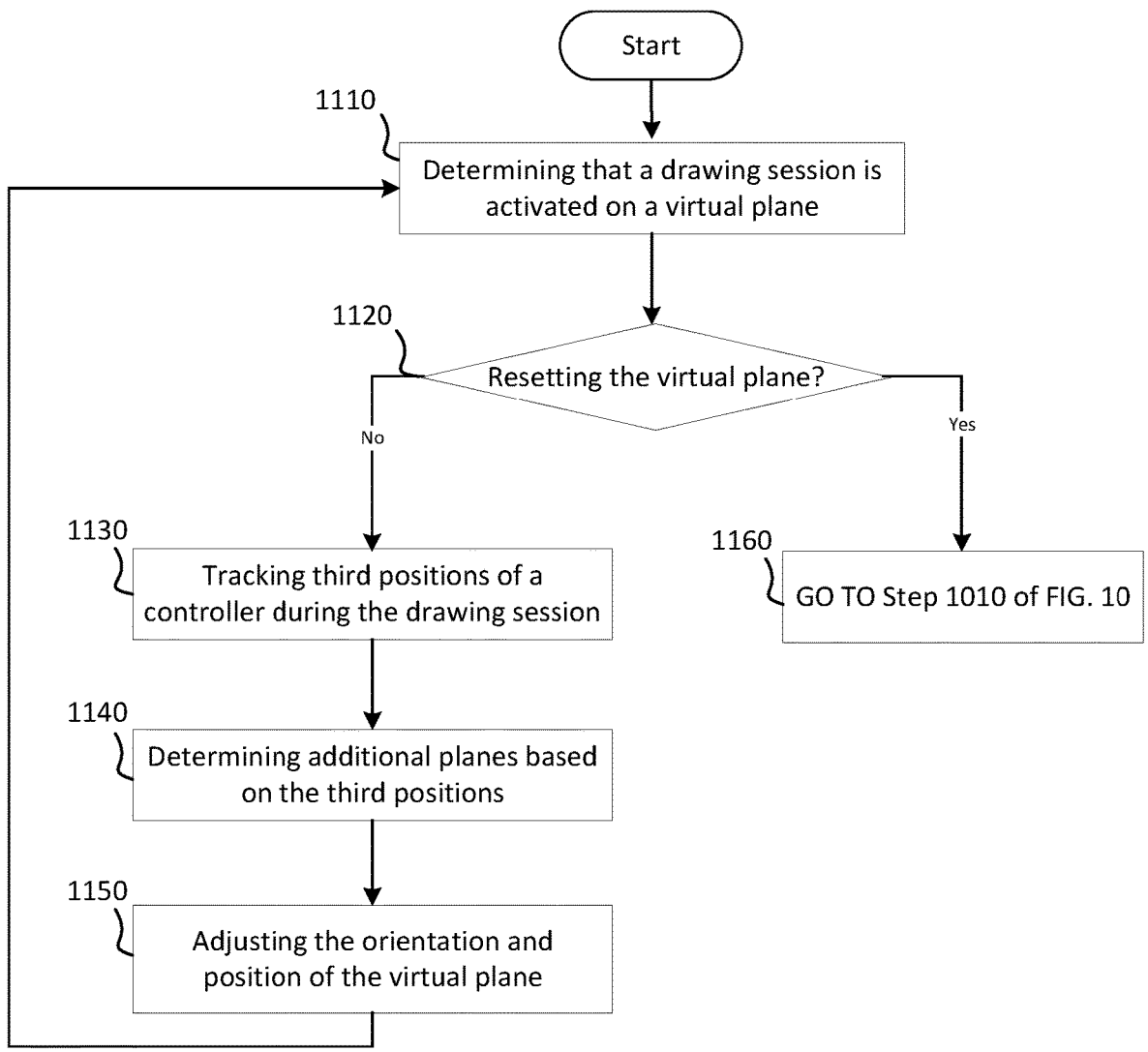
FIG. 11 illustrates an example flow chart of adjusting an orientation of a virtual plane.

FIG. 11 illustrates an example flow chart of adjusting an orientation of a virtual plane. At Step 1110, the system 100 may determine that a drawing session is activated in order for the user 102 to draw on the virtual plane. As previously described, during the drawing session, when one or more of the second positions are identified to be within the threshold distance of the virtual plane, the computing system 100 may generate and persist corresponding drawings (e.g., a line that corresponds to the identified positions). At Step 1120, the system 100 may check if the user 102 wishes to reset the virtual plane. In one embodiment, if the user 102 resets the virtual plane by, e.g., issuing a command via the controller 106 or failing to draw on the virtual plane for a predetermined amount of time, the system 100, at Step 1160, may repeat the processes starting at Step 1010 of FIG. 10 to determine whether the user wishes to draw on another virtual plane and generate one accordingly. If the virtual plane is not reset, the system 100, at Step 1130, may track third positions of the controller during the drawing session and use them to adjust the orientation of the virtual plane. In particular embodiments, the third positions used for adjustment purposes may be limited to those that are within a predetermined threshold distance from the virtual plane (e.g., 0, 2, 5 millimeters), since these positions may be assumed to be tracked when the user is drawing in the virtual plane. At Step 1140, the system 100 may determine additional planes based on the third positions. The additional planes may be estimated through the same processes as described in FIGS. 3-9. At Step 1150, the system 100 may adjust an orientation of the virtual plane based on the additional planes. For example, the normal vectors of the additional planes may be used to adjust the normal vector (e.g., $N_c$) of the virtual plane, which in turn dictates the orientation of the virtual plane. In particular embodiments, the normal vectors of the additional planes may be used to define a new normal vector $N_c'$, similar to how $N_c$ was generated. The new normal vector $N_c'$ may then be used to update the current normal vector $N_c$ by, e.g., taking a weighted average of the two normal vectors or using any other suitable methods. In addition, the system 100 may determine a new anchor point to adjust the position of the virtual plane. The new anchor point may be any of the tracked third positions, an aggregate of more than one of the tracked third positions, or any point along the curve defined by the tracked third positions. The new anchor point may then be used to update the current anchor point by, e.g., taking a weighted average of the anchor points. The updated anchor point and the updated normal vector may then define an updated virtual plane. In particular embodiments, the process may then repeat, starting at Step 1110. In this manner, inaccuracies in the normal vector $N_c$ of the virtual plane may be refined over the course of the drawing session.

The technique described above continuously updates the estimated virtual plane based on observations of the user's drawing motion over a short period of time (e.g., the last 3, 5, or 10 seconds). However, when the sensors and algorithms used for tracking the user's drawing motion are imprecise or susceptible to drift, the estimated virtual plane may consequently change frequently, making it seem unstable to the user. Thus, in particular embodiments, "support points" may be used to stabilize the virtual plane once it has been discovered.

An embodiment that uses support points will now be described. During the surface discovery phase, the computing system may use the process described above (e.g., Steps 1010-1040 of FIG. 10) to generate a virtual plane. After the virtual plane has been discovered, the positions of the user's controller or hand will continue to be tracked. If a stroke defined by a sequence of tracked positions is substantially planer (e.g., a predefined threshold number or a predefined proportion of the tracked positions are co-planar) and sufficiently close to the virtual plane (e.g., within 1, 2, 5, or 10 millimeters), then one or more support points may be generated and added to a group of support points. In particular embodiments, a stroke can be planer if the stroke spans a 2D surface (e.g., the user is drawing a box or scribbling in a 2D area). In such a stroke, there exist three positions within the stroke that can be used to form a triangle, which in turn can be used to define a planar surface, as described above. In contrast, if the stroke is a straight line (i.e., 1D), then no triangle can be formed and, consequently, the stroke would not be considered to be planar.

When a planar stroke is detected, one or more support points may be generated and added to the group of support points (this group may contain previously-generated support points). In particular embodiments, the generated support points may correspond to the tracked positions that define the planar stroke. Alternatively or additionally, a generated support point may be an average of the tracked positions that define the planar stroke. Alternatively or additionally, the generated support point may correspond to an anchor point of the planar surface in which the planar stroke is drawn. In embodiments where the tracking system is good (e.g., tracking is not susceptible to significant drift and the physical and virtual worlds do not become substantially misaligned over time), the support points added to the group may be persisted until the virtual surface is reset (e.g., when the user wishes to draw on a different surface or turn off the system). In embodiments where the tracking system is susceptible to drift or misalignment, each support point added to the group may have a timestamp or any other indicator of age. In this case, the system may delete expired support points according to their age (e.g., support points that are more than 1, 5, or 10 minutes old may be deleted) and continuously add new support points to the group.

The group of support points is used to define the current virtual plane that the user can draw on. In contrast to the embodiment described earlier where the virtual plane is continuously adjusted based on the latest tracking positions (e.g., Steps 1130-1150 in FIG. 11), the virtual plane available to the user may instead be defined by the group of support points. For example, a best-fit algorithm may be used to find a virtual plane whose distance to each of the support points is minimized. As described with reference to Steps 1050-1080, the user may draw on the virtual plane defined in this manner. If the user's drawings are not sufficiently close to the virtual plane (e.g., the tracked positions are consistently more than a predefined threshold distance away from the virtual surface), then the system may alert the user and/or restart the discovery phase (e.g., Steps 1010-1040 of FIG. 10).

Figure 12:
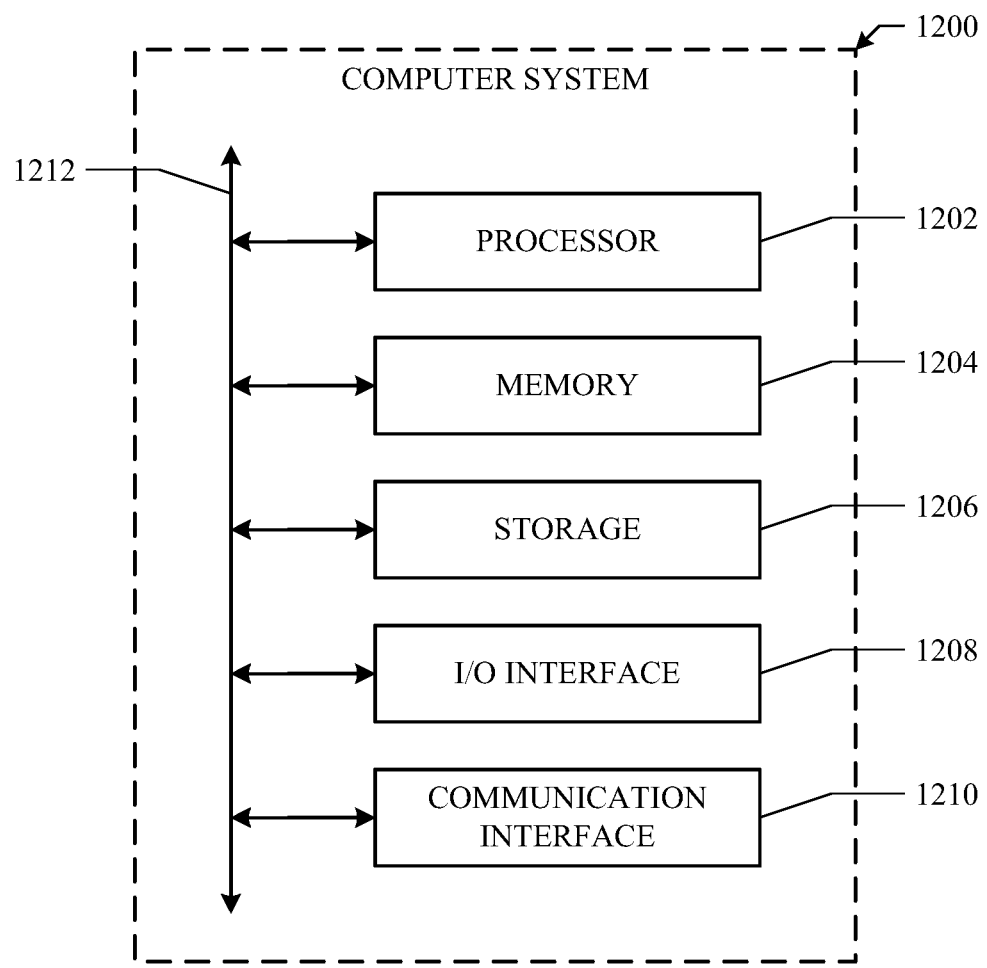
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   tracking first positions of a controller in a three-dimensional space;
   determining a plurality of planes based on the first positions;
   determining that the plurality of planes are within a threshold deviation of each other;
   generating a virtual plane based on the plurality of planes;
   tracking second positions of the controller in the three-dimensional space;
   identifying one or more of the second positions that are within a threshold distance of the virtual plane;
   generating a drawing in the virtual plane based on the one or more of the second positions; and
   rendering a scene depicting the drawing.

2. The method of claim 1, further comprising:
   tracking third positions of the controller in the three-dimensional space;
   determining one or more additional planes based on the third positions; and
   adjusting an orientation of the virtual plane based on the one or more additional planes.

3. The method of claim 1, further comprising:
splitting a predetermined period of time during which the first positions are tracked into three or more time segments;
wherein each of the plurality of planes is determined based on three or more of the first positions that are respectively associated with the three or more time segments.

4. The method of claim 1, further comprising:
determining a plurality of normal vectors of the plurality of planes;
wherein the determination that the plurality of planes are within the threshold deviation is based on the plurality of normal vectors of the plurality of planes.

5. The method of claim 4, further comprising:
determining, based on the plurality of normal vectors, a normal vector for generating the virtual plane;
wherein the virtual plane is generated based on the normal vector.

6. The method of claim 1, wherein the controller is moving along a physical surface when the first positions are tracked, wherein the virtual plane is substantially coplanar with the physical surface.

7. The method of claim 1, further comprising:
resetting the virtual plane in response to an instruction from a user;
tracking third positions of the controller in the three-dimensional space; and
generating a new virtual plane using the third positions.

8. A system comprising:
one or more processors; and
one or more computer-readable non-transitory storage media coupled to one or more of the processors and comprising instructions operable when executed by one or more of the processors to cause the system to:
track first positions of a controller in a three-dimensional space;
determine a plurality of planes based on the first positions;
determine that the plurality of planes are within a threshold deviation of each other;
generate a virtual plane based on the plurality of planes;
track second positions of the controller in the three-dimensional space;
identify one or more of the second positions that are within a threshold distance of the virtual plane;
generate a drawing in the virtual plane based on the one or more of the second positions; and
render a scene depicting the drawing.

9. The system of claim 8, wherein the one or more processors are further operable when executing the instructions to:
track third positions of the controller in the three-dimensional space;
determine one or more additional planes based on the third positions; and
adjust an orientation of the virtual plane based on the one or more additional planes.

10. The system of claim 8, wherein the one or more processors are further operable when executing the instructions to:
split a predetermined period of time during which the first positions are tracked into three or more time segments;
wherein each of the plurality of planes is determined based on three or more of the first positions that are respectively associated with the three or more time segments.

11. The system of claim 8, wherein the one or more processors are further operable when executing the instructions to:
determine a plurality of normal vectors of the plurality of planes;
wherein the determination that the plurality of planes are within the threshold deviation is based on the plurality of normal vectors of the plurality of planes.

12. The system of claim 11, wherein the one or more processors are further operable when executing the instructions to:
determine, based on the plurality of normal vectors, a normal vector for generating the virtual plane;
wherein the virtual plane is generated based on the normal vector.

13. The system of claim 8, wherein the controller is moving along a physical surface when the first positions are tracked, wherein the virtual plane is substantially coplanar with the physical surface.

14. The system of claim 8, wherein the one or more processors are further operable when executing the instructions to:
reset the virtual plane in response to an instruction from a user;
track third positions of the controller in the three-dimensional space; and
generate a new virtual plane using the third positions.

15. One or more computer-readable non-transitory storage media embodying software that is operable when executed to:
track first positions of a controller in a three-dimensional space;
determine a plurality of planes based on the first positions;
determine that the plurality of planes are within a threshold deviation of each other;
generate a virtual plane based on the plurality of planes;
track second positions of the controller in the three-dimensional space;
identify one or more of the second positions that are within a threshold distance of the virtual plane;
generate a drawing in the virtual plane based on the one or more of the second positions; and
render a scene depicting the drawing.

16. The one or more computer-readable non-transitory storage media of claim 15, wherein the software is further operable when executed to:
track third positions of the controller in the three-dimensional space;
determine one or more additional planes based on the third positions; and
adjust an orientation of the virtual plane based on the one or more additional planes.

17. The one or more computer-readable non-transitory storage media of claim 15, wherein the software is further operable when executed to:
split a predetermined period of time during which the first positions are tracked into three or more time segments;
wherein each of the plurality of planes is determined based on three or more of the first positions that are respectively associated with the three or more time segments.

18. The one or more computer-readable non-transitory storage media of claim 15, wherein the software is further operable when executed to:
determine a plurality of normal vectors of the plurality of planes;

wherein the determination that the plurality of planes are within the threshold deviation is based on the plurality of normal vectors of the plurality of planes.

19. The one or more computer-readable non-transitory storage media of claim 18, wherein the software is further operable when executed to:
    determine, based on the plurality of normal vectors, a normal vector for generating the virtual plane;
    wherein the virtual plane is generated based on the normal vector.

20. The one or more computer-readable non-transitory storage media of claim 15, wherein the software is further operable when executed to:
    reset the virtual plane in response to an instruction from a user;
    track third positions of the controller in the three-dimensional space; and
    generate a new virtual plane using the third positions.

* * * * *